United States Patent
Fisher, Jr.

(10) Patent No.: US 9,283,706 B2
(45) Date of Patent: Mar. 15, 2016

(54) METHOD AND APPARATUS FOR COMPRESSION MOLDING FIBER REINFORCED THERMOPLASTIC PARTS

(71) Applicant: The Boeing Company, Chicago, IL (US)

(72) Inventor: Edward M. Fisher, Jr., Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/095,711

(22) Filed: Dec. 3, 2013

(65) Prior Publication Data

US 2015/0151495 A1  Jun. 4, 2015

(51) Int. Cl.
| | |
|---|---|
| B29C 45/72 | (2006.01) |
| B29B 11/12 | (2006.01) |
| B29C 43/00 | (2006.01) |
| B29C 43/52 | (2006.01) |
| B29C 43/36 | (2006.01) |
| B29K 105/12 | (2006.01) |

(52) U.S. Cl.
CPC ............. B29C 45/72 (2013.01); B29B 11/12 (2013.01); B29C 43/003 (2013.01); B29C 43/52 (2013.01); B29C 2043/3628 (2013.01); B29K 2105/12 (2013.01)

(58) Field of Classification Search
USPC .................................................. 264/328.16
See application file for complete search history.

(56) References Cited

U.S. PATENT DOCUMENTS

| | | | |
|---|---|---|---|
| 2,949,054 A | 8/1960 | White | |
| 2,954,586 A | 10/1960 | Wacker | |
| 3,646,610 A | 2/1972 | Jackson | |
| 4,029,841 A | 6/1977 | Schmidt | |
| 4,370,390 A | 1/1983 | Burk | |
| 4,433,652 A | 2/1984 | Holtzberg et al. | |
| 4,623,290 A | 11/1986 | Kikuzawa et al. | |
| 4,717,302 A | 1/1988 | Adams et al. | |
| 4,752,201 A * | 6/1988 | Kauffman ........... | B29C 45/0005 425/145 |
| 4,824,314 A | 4/1989 | Stencel | |
| 4,925,719 A | 5/1990 | Staneluis et al. | |
| 4,969,971 A | 11/1990 | Ehnert et al. | |
| 4,983,451 A | 1/1991 | Sugino et al. | |
| 4,987,175 A | 1/1991 | Bunnell, Sr. | |
| 5,056,257 A | 10/1991 | Cook | |
| 5,057,257 A | 10/1991 | Nietzke | |
| 5,061,423 A | 10/1991 | Layden | |

(Continued)

FOREIGN PATENT DOCUMENTS

| | | |
|---|---|---|
| EP | 0344721 A1 | 12/1989 |
| EP | 0419403 A1 | 3/1991 |

(Continued)

OTHER PUBLICATIONS

Griffing, "Thermoplastic Composite Support Structures with Integral Fittings and Method," U.S. Appl. No. 14/095,531, filed Dec. 3, 2013, 41 pages.

(Continued)

*Primary Examiner* — Jacob Thomas Minskey
(74) *Attorney, Agent, or Firm* — Yee & Associates, P.C.

(57) ABSTRACT

A fiber reinforced thermoplastic part with integral fittings is compression molded. A slug of pre-consolidated, fiber reinforced thermoplastic is heated until flowable and then injected into a mold tool to form both the part and the fitting.

25 Claims, 9 Drawing Sheets

(56) References Cited

U.S. PATENT DOCUMENTS

| | | | |
|---|---|---|---|
| 5,062,415 | A | 11/1991 | Weatherby et al. |
| 5,090,857 | A | 2/1992 | Dunn |
| 5,151,322 | A | 9/1992 | Kimoto et al. |
| 5,292,215 | A | 3/1994 | Roberts, III |
| 5,543,092 | A * | 8/1996 | Ibar .............................. 264/40.1 |
| 5,688,426 | A | 11/1997 | Kirkwood et al. |
| 5,935,698 | A | 8/1999 | Pannell |
| 6,106,752 | A | 8/2000 | Chang et al. |
| 6,460,310 | B1 | 10/2002 | Ford et al. |
| 6,521,152 | B1 | 2/2003 | Wood et al. |
| 6,924,021 | B1 | 8/2005 | Colegrove et al. |
| 7,198,739 | B2 | 4/2007 | La Forest et al. |
| 7,208,220 | B2 | 4/2007 | Yamasaki et al. |
| 7,462,879 | B2 | 12/2008 | Oohata et al. |
| 7,527,759 | B2 | 5/2009 | Lee et al. |
| 7,807,005 | B2 | 10/2010 | Rubin et al. |
| 7,871,553 | B2 | 1/2011 | Wilkerson et al. |
| 7,896,599 | B2 | 3/2011 | Stephen et al. |
| 8,101,262 | B2 | 1/2012 | Yamanouchi et al. |
| 8,329,280 | B2 | 12/2012 | Taketa et al. |
| 8,333,858 | B2 | 12/2012 | Rubin et al. |
| 8,419,997 | B2 * | 4/2013 | Hackl ..................... B29B 13/10 264/328.17 |
| 8,465,241 | B2 | 6/2013 | Gaw et al. |
| 8,491,745 | B2 | 7/2013 | Wilkerson et al. |
| 2003/0057590 | A1 | 3/2003 | Loher et al. |
| 2006/0125156 | A1 | 6/2006 | Woolhouse |
| 2007/0149080 | A1 | 6/2007 | Asahara et al. |
| 2007/0175573 | A1 | 8/2007 | Fox et al. |
| 2008/0169380 | A1 | 7/2008 | Jackson et al. |
| 2011/0111172 | A1 | 5/2011 | Gideon et al. |
| 2011/0206906 | A1 | 8/2011 | Rubin et al. |
| 2011/0223273 | A1 | 9/2011 | Honma et al. |
| 2013/0022391 | A1 | 1/2013 | Fisher, Jr. et al. |
| 2013/0047403 | A1 | 2/2013 | Gideon et al. |
| 2013/0189478 | A1 | 7/2013 | Fisher, Jr. et al. |

FOREIGN PATENT DOCUMENTS

| | | | |
|---|---|---|---|
| EP | 0916477 | A1 | 5/1999 |
| EP | 1745914 | A2 | 1/2007 |
| EP | 1849588 | A1 | 10/2007 |
| EP | 0376472 | A2 | 7/2009 |
| GB | 2349600 | A | 11/2000 |
| WO | 8909123 | A1 | 10/1989 |
| WO | WO2006044315 | A2 | 4/2006 |
| WO | 2008149615 | A1 | 12/2008 |
| WO | 2009120920 | A1 | 10/2009 |
| WO | 2011056293 | A1 | 5/2011 |

OTHER PUBLICATIONS

Fisher, Jr. et al., "Hybrid Laminate and Molded Composite Structures," U.S. Appl. No. 14/095,693, filed Dec. 3, 2013, 30 pages.

Batra, "A Novel Process: Exjection," Popular Plastics & Packaging, Colouor Publication Ltd., Jun. 2010, pp. 51-53.

"Exjection: Injection Mounding in a New Dimension," IB Steiner, 1 page, accessed Nov. 25, 2013. http://www.exjection.com/en/index.html.

Knights, "Close-Up on Technology: New Low-Pressure Process Molds Long Profiles on Small Presses," Platics Technology, Jul. 2008, 3 pages, accessed Nov. 25, 2013. http://www.ptonline.com/articles/new-low-pressure-process-molds-long-profiles-on-small-presses.

International Search Report and Written Opinion, dated Feb. 10, 2011, regarding Application No. PCT/US2010/048017 (WO2011056293), 10 pages.

"Compression Molding," Wikipedia, dated May 26, 2012, 4 pages, accessed May 30, 2013. http://en.wikipedia.org/wiki/Compression_molding.

"Fabrication Methods," Composites World, dated Nov. 1, 2007, 9 pages, accessed May 30, 2012. http://www.compositesworld.com/articles/fabrication-methods.

"HexMC Moulding Concept: Carbon Epoxy HexMC/C/2000/M77—Product Data," Hexcel Corporation, Publication FTC112h, Oct. 2012, 2 pages.

"HexMC Moulding Concept: Carbon Epoxy HexMC/C/2000/R1A—Product Data," Hexcel Corporation, Publication FTC112f, Dec. 2008, 2 pages.

"HexTow Chopped Fiber: Carbon Fiber—Product Data," Hexcel Corporation, Sep. 2009, 2 pages.

Black "Redeisgning for Simplicity and Economy," High-Performance Composites, Jan. 2012, 4 pages, accessed Feb. 28, 2013. http://www.compositesworld.com/articles/redesigning-for-simplicity-and-economy.

Brosius, "Thermoplastic Composites Making an Impact," Composites World, dated Feb. 1, 2003, 6 pages, accessed May 30, 2012. http://www.compositesworld.com/articles/thermoplastic-composites-making-an-impact.

Pan et al., "Analysis of 3D Random Chopped Fiber Reinforced Composites Using FEM and Random Absorption," ScienceDirect, Computational Materials Science, vol. 43, Issue 3, Sep. 2008, pp. 450-461.

Bartel et al., "Method and Apparatus for Fabricating Composite Fasteners," U.S. Appl. No. 13/773,042, filed Feb. 21, 2013, 29 pages.

Blom, "Hybrid Fastener and Method of Making the Same," U.S. Appl. No. 13/773,120, filed Feb. 21, 2013, 25 pages.

Extended European Search Report, dated Apr. 16, 2015, regarding Application No. EP14191457.2, 7 pages.

Extended European Search Report, dated Apr. 16, 2015, regarding Application No. EP14196023.7, 8 pages.

Extended European Search Report, dated Apr. 21, 2015, regarding Application No. EP14196129.2, 8 pages.

Office Action, dated Sep. 9, 2015, regarding U.S. Appl. No. 14/095,531, 32 pages.

Notice of Allowance, dated Nov. 30, 2015, regarding U.S. Appl. No. 14/095,531, 8 pages.

* cited by examiner

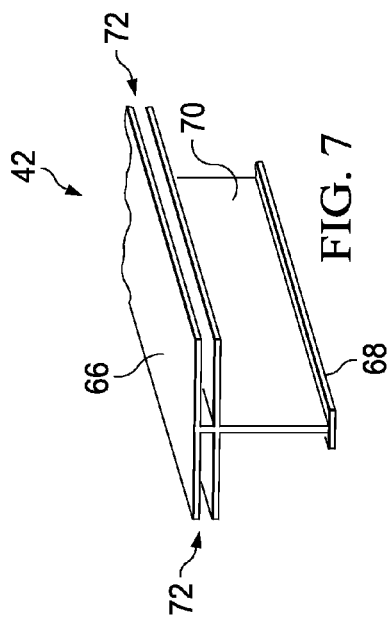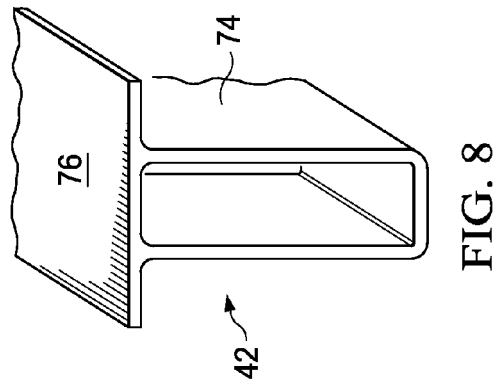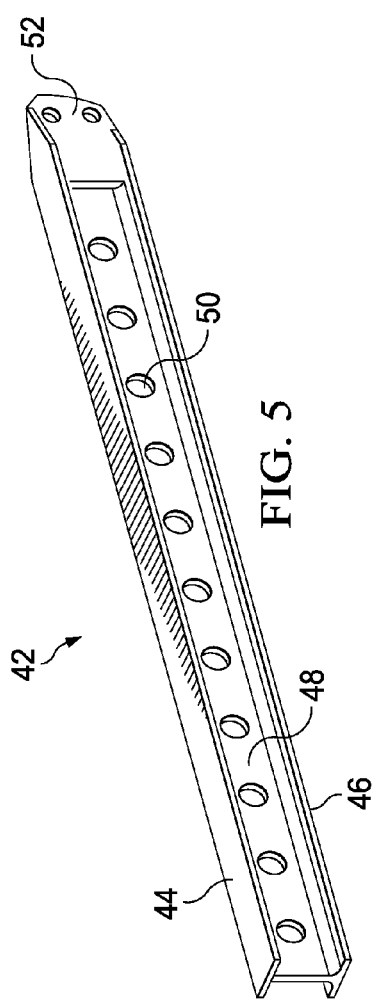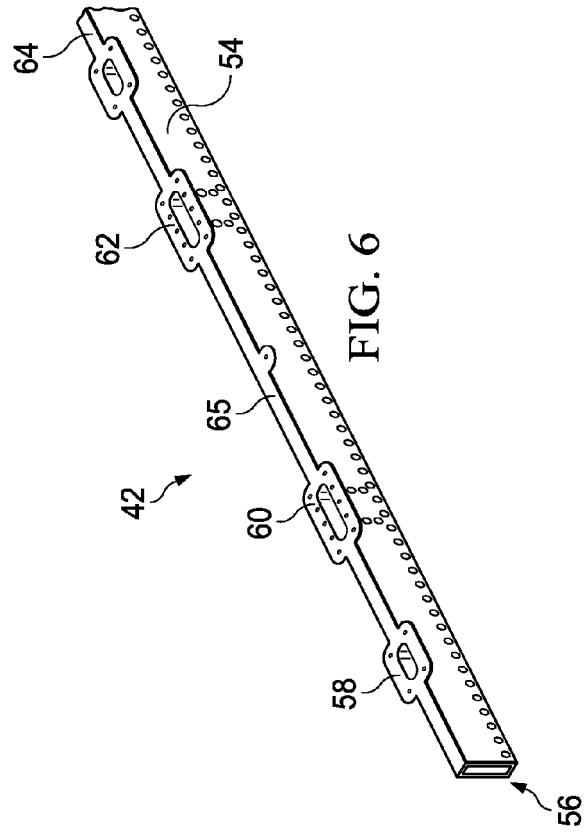

METHOD AND APPARATUS FOR COMPRESSION MOLDING FIBER REINFORCED THERMOPLASTIC PARTS

CROSS REFERENCE TO RELATED APPLICATIONS

This application is related to co-pending U.S. patent application Ser. No. 14/095,531, filed concurrently herewith on Dec. 3, 2013, and co-pending U.S. patent application Ser. No. 14/095,693, filed concurrently herewith on Dec. 3, 2013, both of which applications are incorporated by reference herein in their entireties.

BACKGROUND INFORMATION

1. Field

The present disclosure generally relates to the fabrication of fiber reinforced thermoplastic parts, and deals more particularly with a method and apparatus for compression molding such parts, especially those having complex shapes.

2. Background

In the aircraft and other industries, a variety of parts and structures are fabricated from composites or combination of composites and light weight metals because of their relatively high strength-to-weight ratios. In the case of parts having contours or relatively complex geometries, the parts are often fabricated using thermoset pre-preg tape layup techniques, and autoclave curing. Bandwidths of pre-preg tape or tows are laid up side-by-side to form a multi-ply laminate. In those applications where the part requires fittings at load input locations along the part, custom metal fittings are separately machined and then fastened to the composite laminate part. Depending upon the geometry of the part, fillers, sometimes referred to as "noodles", must be installed in gaps or cavities in the part in order to strengthen joints.

The composite laminate fabrication process described above is time-consuming, labor intensive and requires expensive capital equipment such as automatic fiber placement machines. Moreover, these composite laminate parts may be heavier than desired because pad-ups required for localized strengthening must be formed gradually, thus requiring placement of the of additional ply materials. Also, composite laminate parts may exhibit notch sensitivity around openings in the laminate, such as around lightening holes that are drilled or cut in the laminate part after it has been cured.

Thermoplastic parts having discontinuous fiber reinforcement may be molded into a variety of shapes, however the ability to integrate part features is limited due to the high viscosity of the melted thermoplastic resin which limits resin flow. The ability to flow resins is particularly limited where the reinforcement fibers are relatively long, the fiber content is high, and the required flow distances are long. Also, molding techniques such as injection molding may have a tendency to damage the fibers, thereby affecting the strength of the molded part. Other molding techniques, such as extrusion molding are limited to producing a single, straight part having a uniform cross-sectional shape.

Accordingly, there is a need for a method and apparatus for fabricating composite parts having curves, contours or complex geometries which obviate the need for laying up lamina, and which reduce touch labor as well as expensive capital equipment. There is also a need for composite parts with complex geometries having integrated features and fittings that can be quickly and economically fabricated in high rate production environments.

SUMMARY

The disclosed embodiments provide a method and apparatus for producing composite parts using compression molding of thermoplastic resins reinforced with discontinuous fibers. Composite parts having contours, curves and/or complex geometries can be fabricated without the need for vacuum bagging and autoclave processing. Fittings can be integrated into the parts, thereby reducing or eliminating the need to separately fabricate and attach the fittings to the parts. The touch labor required part for fabrication is reduced, and total part weight may be decreased. Parts with complex geometries can be fabricated more quickly and economically using relatively inexpensive molding equipment. Reinforced thermoplastic parts having a high content of discontinuous fibers may be molded inexpensively, and without substantially damaging the fibers during the molding process. Long resin flow distances may be achieved to permit molding complex part features at any point along the length of the part. Elongated reinforced thermoplastic parts having cross-sections that vary in geometry along their length, including changes in size, thickness and curvature are made possible.

According to one disclosed embodiment, a method is provided of compression molding an elongated fiber reinforced thermoplastic part. The method comprises loading a mold charge, including loading a quantity of fiber reinforced thermoplastic resin flakes, and heating the mold charge until the mold charge is flowable. Loading the mold charge may be performed by loading the quantity of fiber reinforced thermoplastic resin flakes into a cylinder. Heating the mold charge includes heating the fiber reinforced thermoplastic resin flakes to a melting temperature of the resin. The method also includes heating a mold, and molding the mold charge into a part. The mold charge is molded into the part by injecting the flowable mold charge into the heated mold. The method further includes cooling the mold until the mold charge is capable of retaining its shape, following which the molded mold charge may be removed from the mold. Cooling is achieved by cooling the mold to a temperature that is below the glass transition temperature of resin in the flakes. The heating the mold charge to the melt temperature of the resin in the flakes causes the mold charge to become flowable. The mold charge may be pre-consolidated and loaded into a cylinder which is heated and used to inject the flowable mold charge into the heated mold. The mold charge may be pre-consolidated into a slug that may be stored until ready for use. Loading the mold charge includes loading the slug. Pre-consolidation may be achieved by placing the quantity of fiber reinforced resin flakes into a chamber, heating the fiber reinforced flaks to a melting temperature of a resin in the fiber reinforced flakes until they adhere to each other while compressing them, and then cooling the slug until the flakes form a desired shape that can be handled and stored. When ready for use, the pre-consolidated slugs are loaded into charge cylinder and reheated to the melt temperature of the resin.

According to another embodiment, a method is provided of compression molding a thermoplastic composite part having at least one integral fitting. A charge of fiber reinforced thermoplastic resin flakes is pre-consolidated, and the charge is placed in a cylinder. The cylinder is coupled with a mold tool having a part cavity and at least one fitting cavity. The pre-consolidated charge is heated within the cylinder to form a flowable mixture of thermoplastic resin and reinforcing fibers. The flowable mixture is flowed into the part cavity and the fitting cavity by compressing the flowable mixture within the cylinder. Pre-consolidation of the charge may be achieved by placing a quantity of fiber reinforced thermoplastic resin flakes in a tube, heating the fiber reinforced thermoplastic flakes until they soften and adhere to each other, and compressing the heated fiber reinforced thermoplastic flakes into a slug. The slug is placed into the cylinder and is compressed by a piston in the cylinder to cause a flowable mixture of resin and fibers to be injected into the mold tool. Optionally, a mold module having a fitting cavity may be attached to the mold tool in order to mold a fitting integral with the part.

According to still another embodiment, apparatus is provided for compression molding a fiber reinforced plastic resin part. The apparatus comprises a mold tool having a part cavity, and a cylinder coupled with the part cavity and adapted to contain a pre-consolidated charge of fiber reinforced thermoplastic resin flakes. The apparatus also includes a heater for heating the pre-consolidated charge into a flowable mixture of resin and reinforcing fibers, and a piston in the cylinder. An actuator coupled with the piston forces the piston to compress the flowable mixture and forces the flowable mixture into the part cavity. The mold tool may include a mold module having a mold fitting cavity for molding a fitting integral with the part. The mold module may be removable from the mold tool. The part cavity may be elongate and include a longitudinal axis, and cylinder may include a longitudinal axis generally axially aligned with the longitudinal axis of the part cavity. The heater comprises a plurality of heating bands surrounding the cylinder for heating the cylinder. The apparatus may further comprise a tool for pre-consolidating the charge into a generally cylindrical slug. The tool includes a tube into which a quantity of fiber reinforced thermoplastic resin flakes can be introduced. One or more band heaters are sleeved over the tube for heating the tube. A mass may be introduced into the tube for compressing the fiber reinforced thermoplastic resin flakes under the force of gravity acting on the mass.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 5 is an illustration of a perspective view of a fiber reinforced, thermoplastic I-beam having an integral end fitting.

FIG. 6 is an illustration of a perspective view of a fiber reinforced, thermoplastic hollow beam having integral fittings.

FIG. 7 is an illustration of a perspective view of the end of a fiber reinforced, thermoplastic T-frame.

FIG. 8 is an illustration of a perspective view of the end of a fiber reinforced, thermoplastic hat stringer.

DETAILED DESCRIPTION

Figure 1:
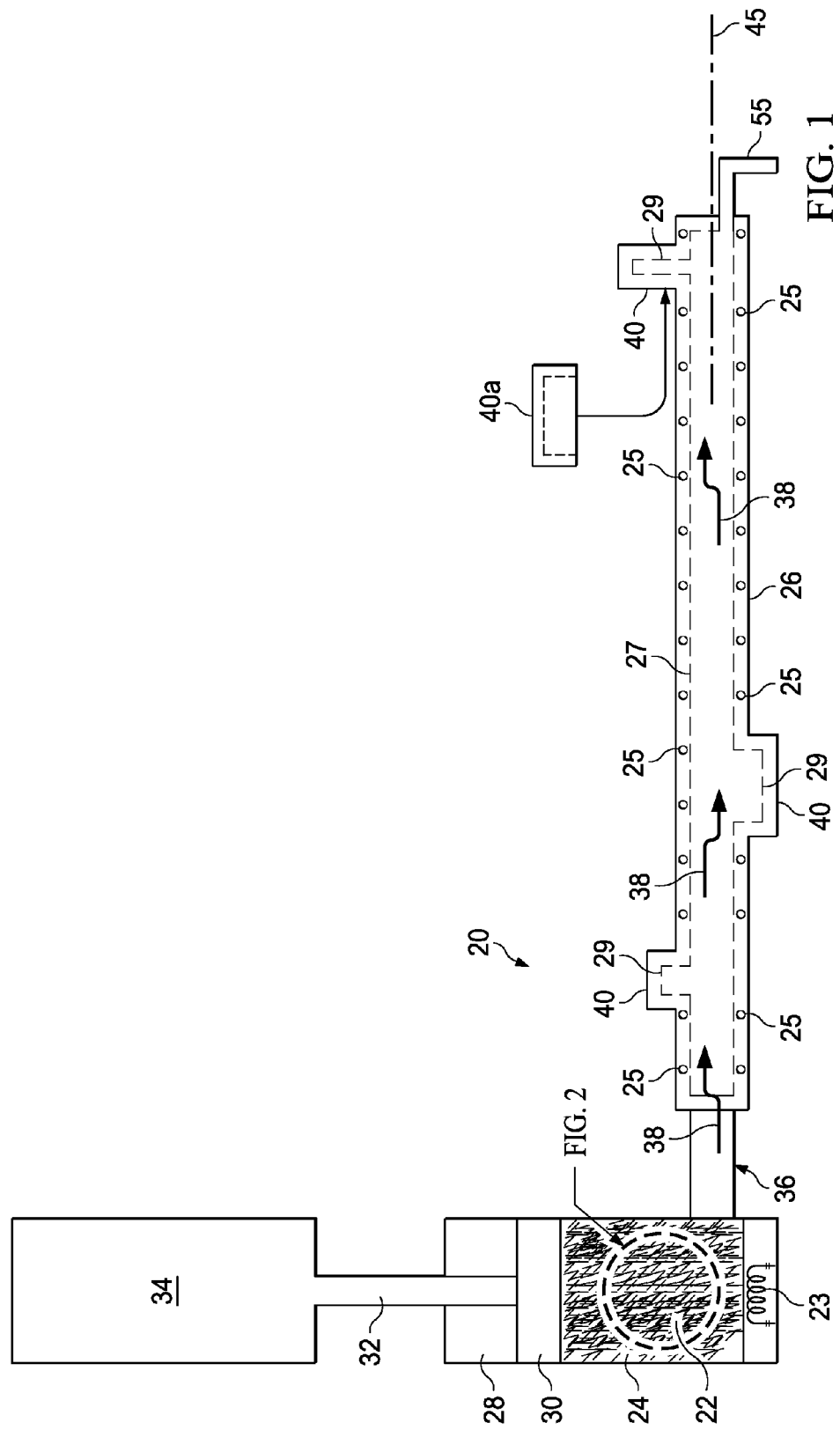
FIG. 1 is an illustration of a diagrammatic, side view of apparatus for compression molding fiber reinforced, thermoplastic parts.
Figure 2:
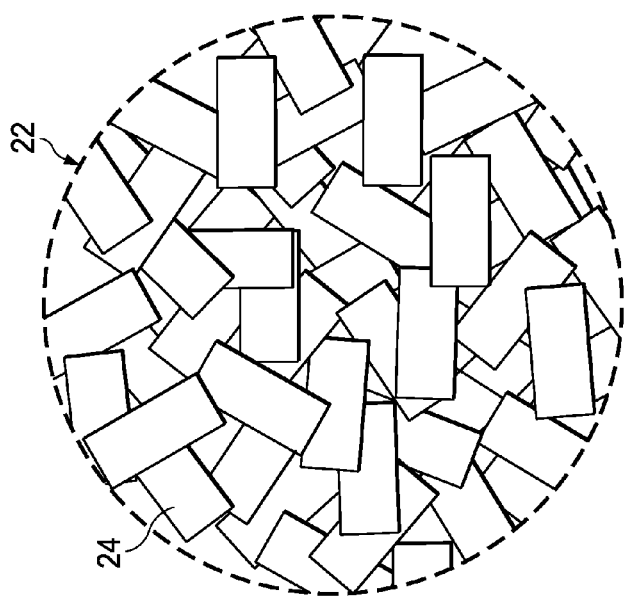
FIG. 2 is an illustration of the area designated as "FIG. 2" in FIG. 1.

Referring to FIGS. 1 and 2, the disclosed embodiments relate to apparatus 20 for compression molding any of a variety of elongated thermoplastic resin parts 42 (FIGS. 5-8) that are reinforced with discontinuous fibers. The apparatus 20 broadly includes an elongate mold tool 26 and a charge cylinder 28 adapted to hold a charge 22 comprising a quantity of thermoplastic composite (TPC) flakes 24 that have been pre-consolidated. As used herein, "flakes" "TPC flakes" and "fiber flakes" refer to individual pieces, fragments, slices, layers or masses of thermoplastic resin that contain fibers suitable for reinforcing a part 42. An actuator 34, which may comprise, without limitation, a hydraulic motor, is coupled by a ram rod 32 with a piston 30 within the charge cylinder 28. The charge cylinder 28 may be coupled with one end of the mold tool 26 by an injection port 36 to permit a melted charge 22 to be injected into a mold part cavity 27 in the mold tool 26. In other embodiments, discussed below, the charge cylinder 28 may be directly coupled to the mold tool 26. The mold tool 26 may include at least one air vent 55 for allowing the escape of air from the mold part cavity 27 when a melted charge 22 is injected into the mold part cavity 27.

Figure 4:
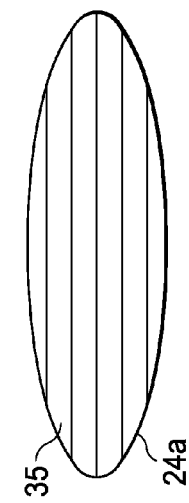
FIG. 4 is an illustration of a flake having an alternate shape.
Figure 3:
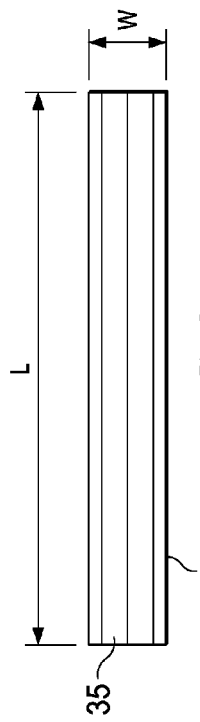
FIG. 3 is an illustration of one of the flakes in a mold charge placed in the apparatus shown in FIG. 2.

FIG. 2 shows a grouping of the TPC flakes 24 used to form the pre-consolidated charge 22, and FIG. 3 shows a single one of the TPC flakes 24. In the illustrated embodiment, each of the TPC flakes 24 has a generally rectangular, long thin shape in which the reinforcing fibers 35 have the substantially same length L and a width W. In other embodiments however, the TPC flakes 24 may have other shapes, and the reinforcing fibers 35 may vary in length L. For example, FIG. 4 illustrates a TPC flake 24 having a generally oval shape, resulting in the fibers 35 having varying lengths L. The presence of fibers 35 having differing lengths may aid in achieving a more uniform distribution of the fibers 35 in the part 42, while promoting isotropic mechanical properties and/or strengthening the part 42. In some embodiments, the pre-consolidated charge 22 may be formed using a mixture of TPC flakes 24 having differing sizes and/or shapes. In one embodiment, the fibers 35 may have a length of approximately 0.5 inches up to or greater than approximately 1.0 inches. The ratio of the resinto-fibers 35 in each of the flakes 24 may be relatively high, resulting in a flowable mixture of fibers 35 and melted resin having a fiber content that is greater than 30% and which maybe up to or greater than 65% of the mixture, by volume.

The thermoplastic resin in the flakes 24 may comprise a relatively high viscosity thermoplastic resin such as, without limitation, PEI (polyetherimide) PPS (polyphenylene sulphide), PES (polyethersulfone), PEEK (polyetheretherketone), PEKK (polyetheretherketone), and PEKK-FC (polyetherketoneketone-fc grade), to name only a few. The reinforcing fibers 35 in the flakes 24 may be any of a variety of high strength fibers, such as, without limitation, carbon, metal, ceramic and/or glass fibers.

Referring again to FIG. 1, the apparatus 20 may include a suitable heating device, such as, without limitation, integrated electrical resistance heating coils 23 or a similar heating device, that heats the charge 22 in the charge cylinder 28 until the resin in the flakes 24 melt and form a flowable mixture of thermoplastic resin and randomly oriented, discontinuous reinforcement fibers 35. The piston 30 driven by actuator 34 moves through the cylinder 28 to compress the charge 22, and force the melted mixture of resin and fibers 35 to flow 38 through the injection port 36 and into the mold part cavity 27 of the mold tool 26. The mold tool 26 is heated and cooled using internal heating/cooling fluid passageways 25 (FIG. 1), however other mold heating techniques may be used such as electrical resistive heating or inductive heating.

Optionally, the apparatus 20 may have one or more mold modules 40 permanently or removably attached to the mold tool 26. Each of the mold modules 40 includes a mold fitting cavity 29 coupled with the mold part cavity 27 for molding a corresponding fitting or other feature integral with the part 42, such as features of the parts 42 shown in FIGS. 5, 6, 7 and 8 discussed below. Each of the mold modules 40 may be removed and replaced with another mold module 40a, thereby allowing fittings with different sizes or shapes to be integrally molded with the part 42, and accommodating local design changes.

FIGS. 5-8 illustrates exemplary elongated parts 42 that may be compression molded using the disclosed method and apparatus 20. Part 42 shown in FIG. 5 is an I-beam having an integrally molded 2-lug fitting 52 on one end thereof. The I-beam comprises a web integrally molded with upper and lower caps 44, 46 respectively. It may be possible to integrally mold lightening holes 50 in the web 48, although the lightening holes 50 may be drilled or bored through the web 48 after the I-beam is produced.

Part 42 shown in FIG. 6 is a hollow beam having a generally rectangular cross section and an open interior 56 substantially throughout its length. Fittings 58, 60, 62, 64 are integrally formed with and along one wall 65 of the beam. FIG. 7 illustrates a part 42 comprising a T-frame including upper and lower caps 66, integrally formed with a connecting a web 70. The upper cap 66 includes a pair of grooves 72 extending the entire length of the T-frame which are adapted, for example, to receive and mount panel members (not shown). FIG. 8 illustrates still another compression molded part 42, comprising a hat-type stringer. The hat stringer includes a hat portion 74 integrally molded with a flange 76. It should be noted here that although the parts 42 shown in FIGS. 5-8 are substantially straight, any of them may have one or more curves or contours along their lengths. Moreover it can be appreciated from the foregoing that the part 42 may have a cross-sectional shape that varies along the length of the part 42.

Figures 9, 10:
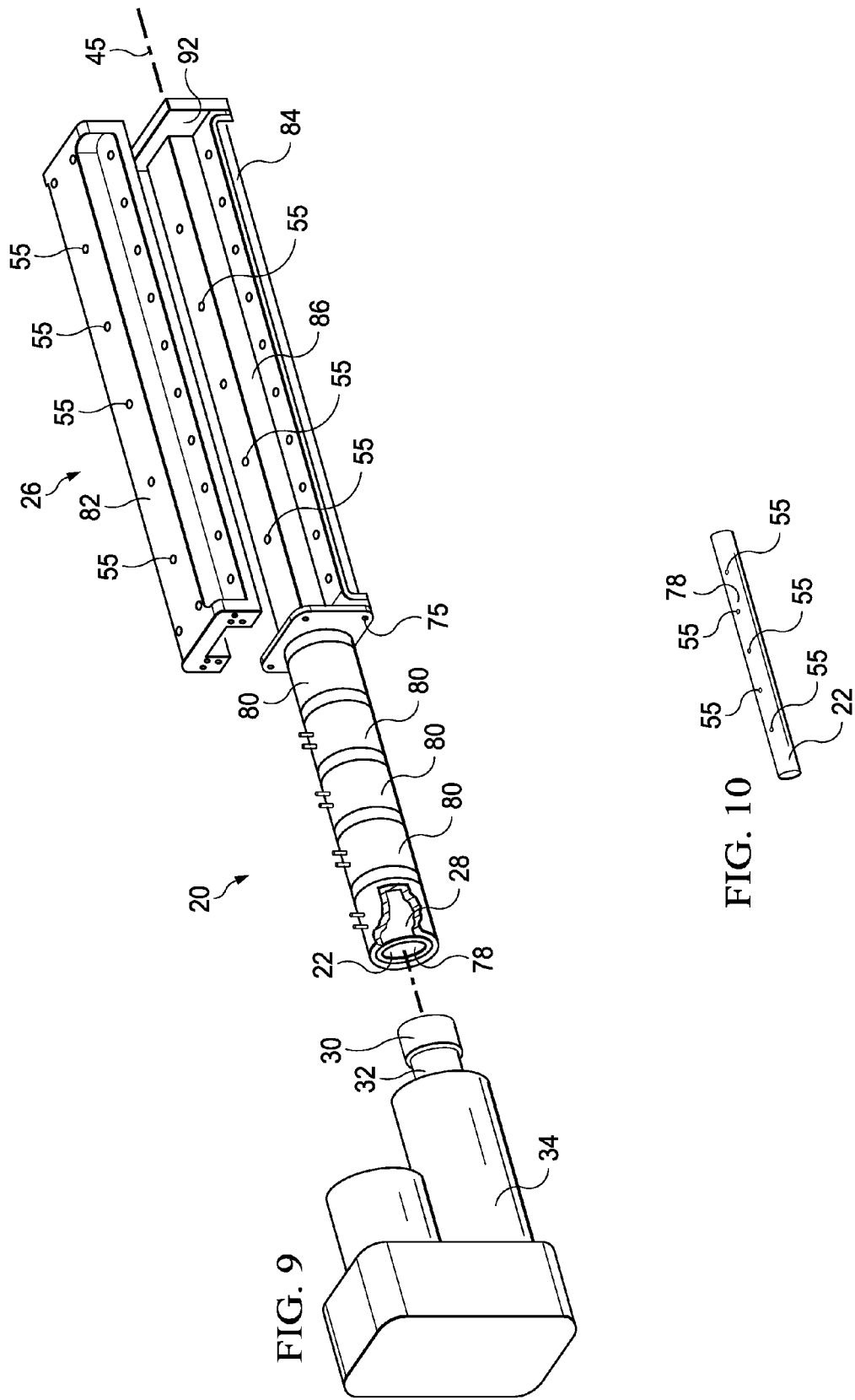
FIG. 9 is an illustration of a perspective view of apparatus for compression molding fiber reinforced thermoplastic parts, a modular mold tool partially exploded to reveal a mold insert, parts of one of the band heaters broken away in section to better show a charge cylinder.
FIG. 10 is an illustration of a perspective view of a pre-consolidated thermoplastic slug used in the apparatus shown in FIG. 9.

Attention is now directed to FIGS. 9, 10 and which illustrate another embodiment of apparatus 20 for compression molding thermoplastic resin parts 42 reinforced with discontinuous fibers 35 (FIG. 3). In this example, the actuator 34 comprises a hydraulically driven actuator 34 that linearly displaces a piston 30 received within an elongate charge cylinder 28. One end of the charge cylinder 28 is removably attached, as by fasteners 75, to one and of an elongate mold tool 26. The mold tool 26 comprises an elongate mold insert 86 enclosed within a modular tool top 82, a modular tool bottom 84 and an end cap 92 that are fastened or otherwise clamped together. The longitudinal axis of the charge cylinder 28 is substantially aligned with the longitudinal axis 45 of the mold tool 26.

A plurality of band heaters 80 (FIG. 9) are sleeved over the charge cylinder 28 for heating a charge 22 to a temperature that is sufficient to melt the resin in the pre-consolidated charge 22. The band heaters 80 may comprise, for example and without limitation, electro-magnetic induction heaters employing "smart susceptors", however other heating devices may be employed. The charge 22 is a cylindrically shaped slug 78 (FIG. 10) comprising a pre-consolidated mixture of thermoplastic resin and fibers 35 that is produced using TPC flakes 24 of the type previously described. The slug 78 may be inserted into the charge cylinder 28 from the open end of the charge cylinder 28 after the piston 30 has been withdrawn.

Figure 11:
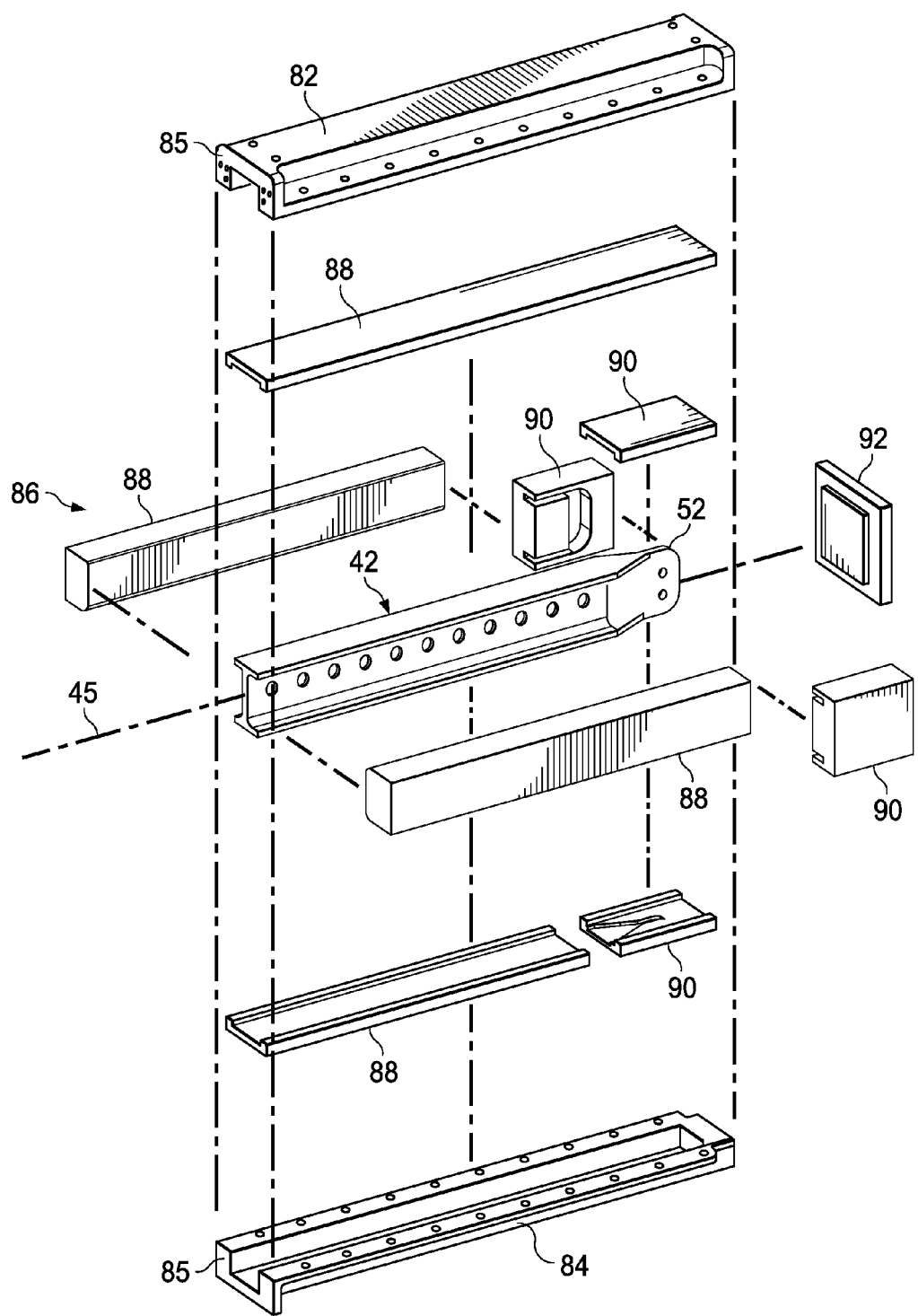
FIG. 11 is an illustration of a perspective, exploded view of the mold tool forming part of the apparatus shown in FIG. 9.

FIG. 11 illustrates additional details of the mold tool 26 in which the mold insert 86 is particularly adapted to compression mold the I-beam part 42 shown in FIG. 5. The mold insert 86 comprises a pair of side mold inserts 88, and top and bottom inserts 88 which collectively form an elongate mold cavity matching the shape of the I-beam part 42. The mold insert 86 further comprises top, bottom and a pair of side fitting inserts 90 which collectively form a mold fitting cavity 29 (see FIG. 1) corresponding to the shape of the end fitting 52. The components of the mold insert 86 are held together as an assembly by the modular top and bottom 82, 84 respectively, and the end cap 92. The modular tool top and bottom 82, 84 include flanges 85 to which the charge cylinder 28 may be attached by fasteners 75 (FIG. 9). The mold tool 26 may be self-heated using any of a variety of techniques, such as by integrated heating coils or internal heating/cooling fluid passageways 25 (see FIG. 1), or may be inductively heated. The mold tool 26 may include multiple air vents 55 along its length which communicate with, and allow the escape of air from the mold cavity when a charge 22 is injected into the mold cavity.

The embodiment of the apparatus 20 shown in FIGS. 9-11 is particularly well adapted to compression mold fiber reinforced plastic resin parts that are elongated. Alignment of the longitudinal axes of the charge cylinder 28 and the mold part cavity 27 formed by the mold insert 86 encourages the free flow of melted resin and fibers 35 into and throughout the length of the mold part cavity 27 with minimal flow resistance. Moreover, use of the charge cylinder 28 and its coaxial alignment with the mold part cavity 27 facilitates a substantially unimpeded, linear flow of resin and fibers into the mold part cavity 27 which reduces the possibility of degradation of the fibers 35 due to breakage or deformation, particularly where the fibers 35 have relatively long lengths.

Referring to FIG. 9, in use, one or more pre-consolidated slugs 78 are placed in the charge cylinder 28. The mold insert 86 is heated to a desired molding temperature that is sufficient to melt the thermoplastic resin, typically between approximately 650° F. and 750° F. The charge cylinder 28 is heated by the band heaters 80 in order to heat the slug 78 to the melting temperature of the resin in the flakes 24. The melted slug 78 forms a flowable mixture of thermoplastic resin and fibers 35. The actuator 34 drives the piston 30 through the charge cylinder 28, forcing the flowable mixture of the melted resin and fibers 35 into the cavity of the mold insert 86. It should be noted here that while the charge 22 may comprise pre-consolidated slugs 78 that are individually loaded into the charge cylinder 28, the charge 22 may also comprise loose fiber reinforced thermoplastic flakes 24 which may or may not be pre-consolidated.

Compression of the slug 78 within the charge cylinder 28 by the piston 30 compresses the slug 78, causing the flowable resin/fiber mixture to be injected into the mold insert 86, and flow throughout all parts of the mold part cavity 27 and any mold fitting cavities 29. Additional slugs 78, which may or a not be preheated, may be inserted into the charge cylinder 28 and melted during a molding cycle in order to supply the quantity of material needed to fill the mold cavities 27, 29. In one embodiment, for example, a group of the slugs 78 may be placed in an oven (not shown) and preheated to near their melt temperature. The preheated slugs 78 may then be removed from the oven one-by-one and loaded into the charge cylinder 28 in a nearly continuous manner until the mold part cavity 27 and the fitting cavities 29 have been completely filled. Temperature and pressure is maintained in the mold cavities 27, 29 until the melted thermoplastic resin crystallizes and becomes fully consolidated. Cooling of the mold tool 26 may be performed using the application of compressed gas or other known techniques.

Figure 12:
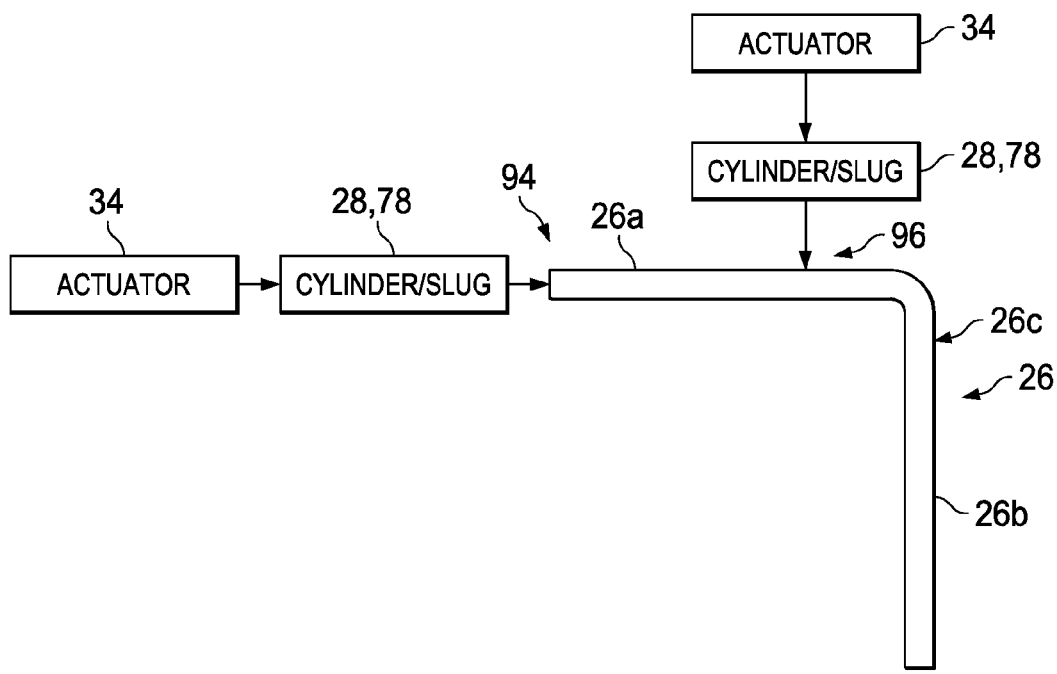
FIG. 12 is illustration of a diagrammatic view of an alternate embodiment of apparatus for compression molding fiber reinforced thermoplastic parts.

Depending upon the shape and complexity of the part 42 to be molded, it may be possible or necessary to inject melted fiber reinforced resin into the mold part cavity 27 at more than one location on the mold tool 26. For example, referring to FIG. 12, a curved mold tool includes two generally perpendicular legs 26a, 26b connected by a radius section 26c, in order to compression mold a generally L-shaped composite part (not shown). In some cases, the radius section 26c of the mold tool 26 may present some resistance to the flow of the melted resin/fiber mixture if injected only at one end 94 of the mold tool 26. Accordingly, the desired resin/fiber mixture flow may be achieved by injecting the resin/fiber mixture at two locations 94, 96 on the mold tool 26, using two sets of the actuator 34, charge cylinders 28 and separate charges in the form of slugs 78.

Figure 12A:
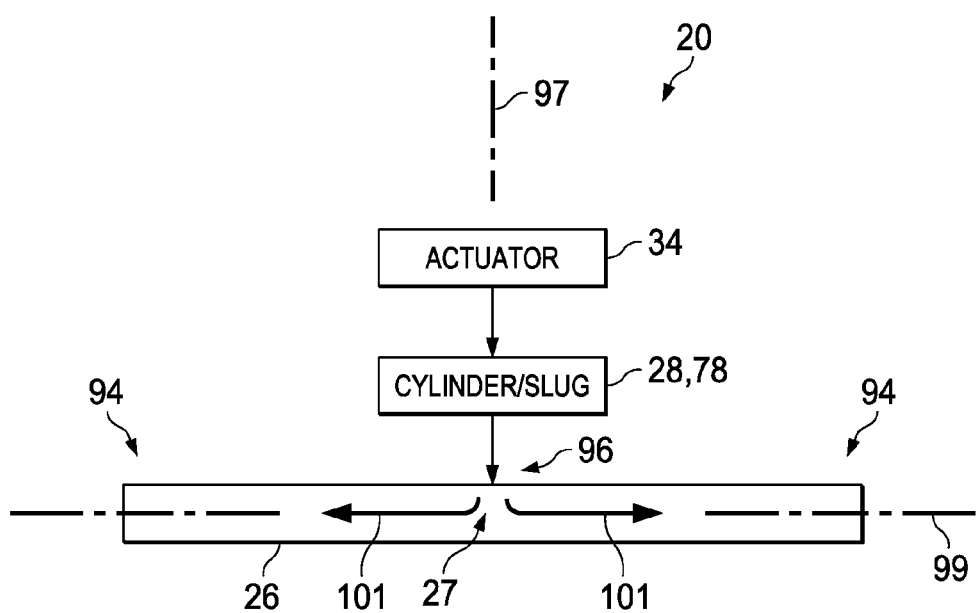
FIG. 12A is illustration of a diagrammatic view of another alternate embodiment of apparatus for compression molding fiber reinforced thermoplastic parts.

FIG. 12A illustrates an alternate form of the apparatus 20 in which the actuator 34 and the cylinder/slug 28, 78 are arranged along an axis 97 that is transverse to the longitudinal axis 99 of the mold part cavity 27, and resin injection occurs at an intermediate location 96 between two opposite ends 94 of the mold part cavity 27. In some embodiments, the intermediate injection location 96 may be at approximately the midpoint between the opposite ends 94 of the mold part cavity 27. In this embodiment of the apparatus 20, by injecting the resin into the mold part cavity 27 at a location 96 that is intermediate two ends 94, the resin flow is split and caused to flow 101 in opposite directions within the mold part cavity 27. Injecting the resin into the mold part cavity 27 at an intermediate location 96 reduces the overall length that the charge 22 is required to flow, which may be desirable where a part, such as the beam 42 shown in FIG. 5, has a long length. Injecting the resin into the mold part cavity 27 at an intermediate location 96 may also facilitate molding an elongated part 42 having a fitting at opposite ends thereof, such as the fitting 52 shown in FIG. 5. Moreover, the arrangement of the apparatus 20 shown in FIG. 12A, wherein the axes 97, 99 are transverse to each other, reduces the overall length "L" of the apparatus 20, and results in a more compact design that may save factory floor space.

Figure 13:
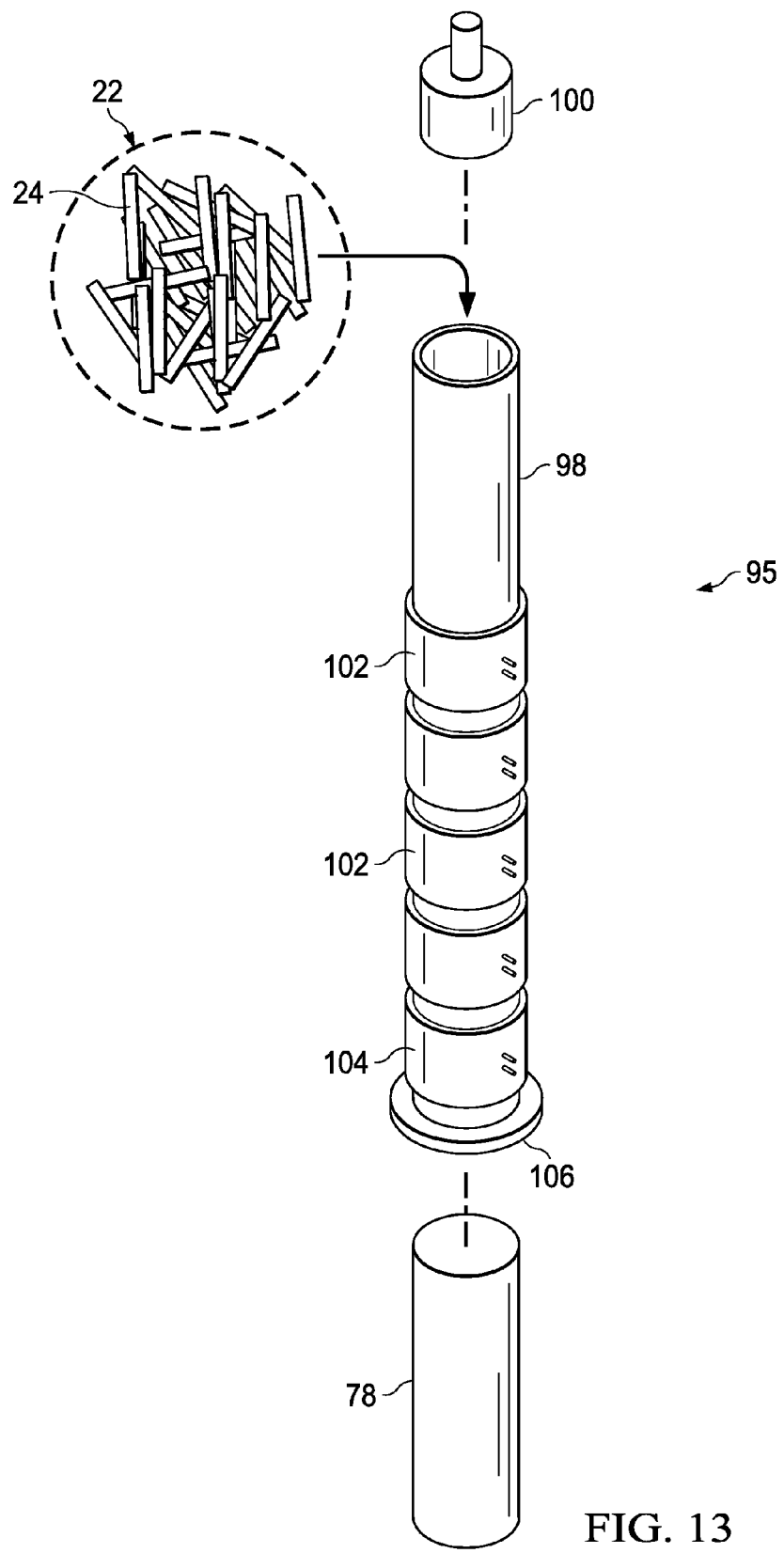
FIG. 13 is an illustration of an isometric view of apparatus for producing the slug shown in FIG. 10.

The slugs 78 of pre-consolidated TPC flakes may be produced using any of several techniques. FIG. 13 illustrates one technique and a tool 95 for making the slugs 78. A chamber such as a tube 98 is filled with a charge 22 of the TPC flakes 24. One or more band heaters 102, which may comprise, for example and without limitation ceramic band heaters, are sleeved over the tube 98 to heat the flakes 24 to the melting temperature of the resin in the flakes 24. Upon reaching this melting temperature, the resin in the flakes 24 flow together. Other techniques can be used to heat the flakes 24 to the melting temperature of the resin, such as placing the tube 98 in an oven (not shown). It may be possible to melt only portions of the flakes 24 such that they adhere to each other and form a mass (slug 78) capable of holding its shape when cooled. A cylindrically shaped compaction mass 100 is inserted into the tube 98. When the flakes 24 have been heated to the melting temperature of the resin, the mass 100 compresses the flakes 24, either through force of gravity or an applied axial load, driving out air from the charge 22 and causing the melted resin in the flakes 24 to flow together.

While remaining compressed by the mass 100, the flakes 24 are allowed to cool, causing the resin containing a dispersion of the fibers 35 to pre-consolidate into a single mass, i.e. the slug 78, or pre-consolidate such that the individual flakes 24 adhere to each other and maintain a shape capable of being handled and stored until ready for use. An end cap 106 on the tube 98 may be removed to allow withdrawal of the slug 78 from the tube 98. Other techniques may be employed to apply the necessary pressure to the charge 22 in order to pre-consolidated the melted flakes 24. For example, the mass 100 may comprise a spring-loaded piston that is placed in the tube 98 in order to apply the necessary compression force to the charge 22. The pre-consolidated slugs 78 may be stored and held at room temperature until ready for use.

Figure 14:
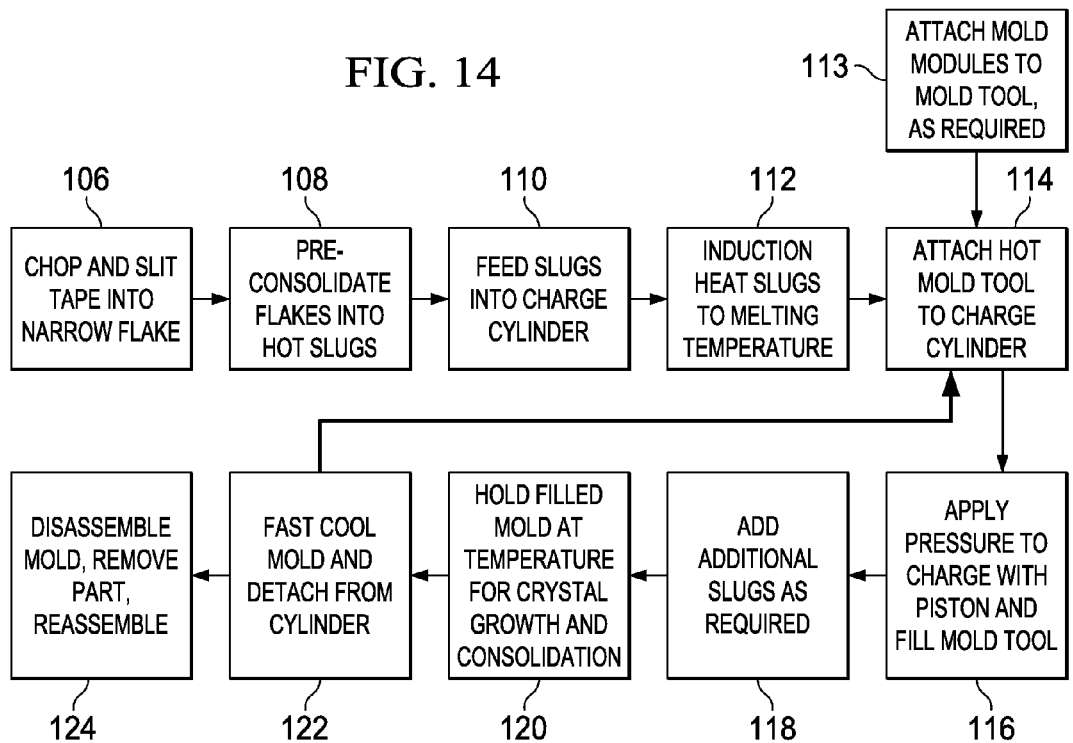
FIG. 14 is illustration of a flow diagram of a method for compression molding fiber reinforced plastic parts.

Attention is now directed to FIG. 14 which broadly illustrates the overall steps of a method of compression molding a fiber reinforced, a thermoplastic resin part 42, especially on elongate part 42 having complex shapes and/or fittings. At 106, bulk TPC tape, typically in the form of rolls, is chopped and slit into relatively narrow flakes 24. At 108, the TPC flakes 24 are pre-consolidated into slugs 78 using the techniques previously described. At step 110, the slug 78, which may or may not be preheated, is loaded into a charge cylinder 28 as a charge 22. At 112, the slug 78 within the charge cylinder 28 may be heated using any of various techniques, such as induction heating to the melting temperature of the resin in the slug, effectively re-melting the resin. Alternatively, a number of the slugs 78 may be heated in one or more groups to the melting temperature of the resin, as by placing them in an oven (not shown) until ready for use. At step 113, depending upon the shape and geometry of the part 42, one or more mold modules 40 may be attached to the mold tool 26, as required. At step 114, the mold tool 26 is heated to at least the melting temperature of the resin and is attached to the charge cylinder 28, and at 116 pressure is applied to the charge 22, causing a flowable mixture of melted thermoplastic resin and the reinforcing fibers to flow into the mold tool 26. At 118, additional slugs 78 may be successively inserted, one-by-one into the charge cylinder 28 as needed, reheated to the resin melt temperature before injection, in order to fill the entire mold cavities 27, 29. By successively inserting the slug 78 in this manner, a plurality of the slugs 78 can be used to flow, nearly continuously, the melted resin/fiber mixture into the mold cavities 27, 29. Thus, a relatively large mold may be filled using a series of the slugs 78.

At 120, the filled mold tool 26 is held at a temperature required for crystal growth and consolidation of the thermoplastic resin. Then, at 122, the mold tool is quickly cooled until the part 42 is capable of being handled, and then detached from the charge cylinder 28. Generally, the mold tool 26 is cooled to a temperature that is below the glass transition temperature of the resin. After a mold tool 26 has been detached from the charge cylinder 28, a different mold tool 26 may be attached to the charge cylinder 28 in order to compression molded additional parts 42. After the mold tool 26 has cooled at 122, it may be disassembled, the part 42 may be removed, and the mold tool 26 may be cleaned and reassembled in preparation for another molding operation.

Figure 15:
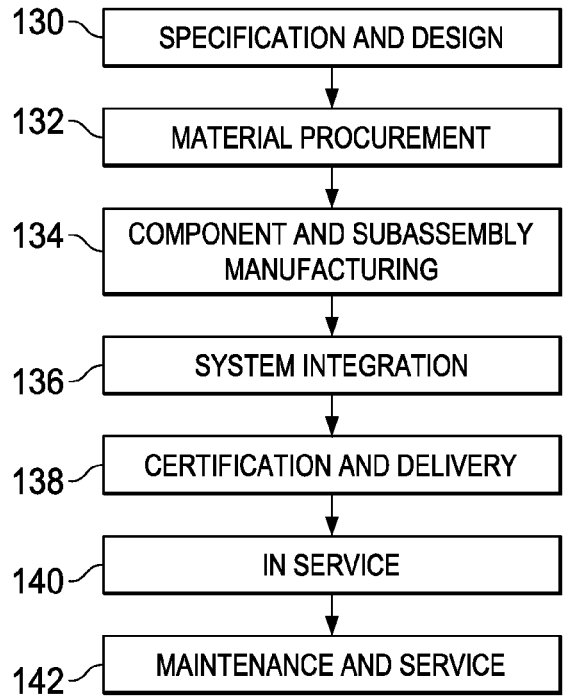
FIG. 15 is an illustration of a flow diagram of aircraft production and service methodology.
Figure 16:
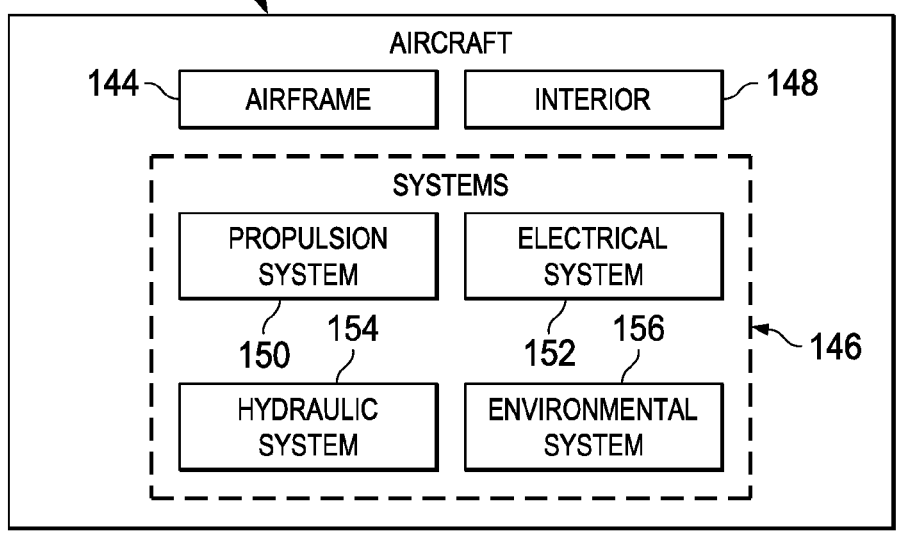
FIG. 16 is an illustration of a block diagram of an aircraft.

Embodiments of the disclosure may find use in a variety of potential applications, particularly in the transportation industry, including for example, aerospace, marine, automotive applications and other application where composite parts and components may be used, especially those having complex features or fittings. Thus, referring now to FIGS. 15 and 16, embodiments of the disclosure may be used in the context of an aircraft manufacturing and service method 126 as shown in FIG. 15 and an aircraft 128 as shown in FIG. 16. Aircraft applications of the disclosed embodiments may include, for example, without limitation, beams, stringers, hangers and stiffeners, to name only a few. During pre-production, exemplary method 126 may include specification and design 130 of the aircraft 128 and material procurement 132. During production, component and subassembly manufacturing 134 and system integration 136 of the aircraft 128 takes place. Thereafter, the aircraft 128 may go through certification and delivery 138 in order to be placed in service 140. While in service by a customer, the aircraft 128 is scheduled for routine maintenance and service 142, which may also include modification, reconfiguration, refurbishment, and so on.

Each of the processes of method 126 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 128 produced by exemplary method 126 may include an airframe 144 with a plurality of systems 146 and an interior 148. Examples of high-level systems 146 include one or more of a propulsion system 150, an electrical system 152, a hydraulic system 154 and an environmental system 156. Any number of other systems may be included. Although an aerospace example is shown, the principles of the disclosure may be applied to other industries, such as the marine and automotive industries.

Systems and methods embodied herein may be employed during any one or more of the stages of the production and service method 126. For example, components or subassemblies corresponding to production process 134 may be fabricated or manufactured in a manner similar to components or subassemblies produced while the aircraft 128 is in service. Also, one or more apparatus embodiments, method embodiments, or a combination thereof may be utilized during the production stages 134 and 136, for example, by substantially expediting assembly of or reducing the cost of an aircraft 128. Similarly, one or more of apparatus embodiments, method embodiments, or a combination thereof may be utilized while the aircraft 128 is in service, for example and without limitation, to maintenance and service 142.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of compression molding an elongated fiber reinforced thermoplastic part, comprising:
pre-consolidating a quantity of fiber reinforced thermoplastic resin flakes into a mold charge, wherein the step of pre-consolidating the quantity of fiber reinforced thermoplastic resin flakes further comprises: placing the quantity of fiber reinforced thermoplastic resin flakes into a chamber, wherein the fiber reinforced thermoplastic resin flakes have a generally oval shape such that fibers of the fiber reinforced thermoplastic resin flakes have varying lengths of between approximately 0.5 inches and approximately 1.0 inches; heating a number of electrical resistance coils integrated into ceramic band heaters sleeved over the chamber to a melting temperature of a resin in the fiber reinforced thermoplastic resin flakes, and compacting the fiber reinforced thermoplastic resin flakes in the chamber into the mold charge;
loading the mold charge into a charge cylinder;
heating the charge cylinder until the mold charge is flowable;
heating a mold, wherein the mold comprises a part cavity and at least one fitting cavity;
injecting the flowable mold charge into the heated mold to mold the mold charge into the part, wherein the step of injecting the flowable mold charge into the heated mold further comprises: injecting the flowable mold charge into the heated mold to mold the mold charge into the part to achieving a uniform distribution of the fibers of varying lengths in the part, wherein the uniform distribution promotes isotropic mechanical properties and strengthens the part; and
cooling the mold until the part is capable of retaining its shape.

2. The method of claim 1, wherein the step of cooling the mold further comprises:
applying a compressed gas through internal cooling fluid passageways of the mold to cool the mold to a temperature that is below a glass transition temperature of a resin in the fiber reinforced thermoplastic resin flakes.

3. The method of claim 1, wherein the step of heating the charge cylinder further comprises:
inductively heating the charge cylinder using a number of electro-magnetic induction heaters to a melt temperature of a resin in the fiber reinforced thermoplastic resin flakes.

4. The method of claim 1, wherein the charge cylinder has a longitudinal axis generally axially aligned with a longitudinal axis of the mold, wherein the step of injecting the flowable mold charge further comprises:
forcing a piston through the charge cylinder along the longitudinal axis of the charge cylinder to form a substantially unimpeded, linear flow of resin and fibers of the flowable mold charge into the mold to reduce a possibility of fiber degradation.

5. The method of claim 1, wherein compacting the fiber reinforced thermoplastic resin flakes further comprises:
placing a cylindrically shaped compaction mass on the fiber reinforced thermoplastic resin flakes in the chamber to compresses the fiber reinforced thermoplastic resin flakes through force of gravity, an applied axial load, or combinations thereof.

6. The method of claim 1, wherein the step of pre-consolidating further comprises:
cooling the mold charge until the mold charge is capable of being handled and stored for later use; and
removing the mold charge from the chamber.

7. The method of claim 6, wherein the step of cooling the mold charge further comprises:
cooling the mold charge sufficiently below a glass transition temperature of the resin to cause the mold charge to hold a desired shape.

8. The method of claim 6, wherein the step of heating the mold charge further comprises:
after removing the mold charge from the chamber, reheating the mold charge in the charge cylinder.

9. The method of claim 8, further comprising:
venting air displaced by the flowable mold charge injected into the heated mold from at least one air vent in the mold; and
repeating the steps of loading the mold charge into the charge cylinder and injecting the flowable mold charge into the heated mold until the mold is filled with a mixture of thermoplastic resin and fibers.

10. The method of claim 1, wherein the mold charge consists essentially of:
a fiber content of about 30% to about 65%, by volume, wherein the fibers are selected from the group consisting of carbon fibers, metal fibers, ceramic fibers, glass fibers, and combinations thereof; and
a resin content of about 35% to about 70%, by volume, wherein the resin is selected from the group consisting polyetherimide resin, polyphenylene sulphide resin, polyethersulfone resin, polyetheretherketone resin, polyetheretherketone resin, polyetherketoneketone-fc grade resin, and combinations thereof.

11. The method of claim 1, wherein the fiber reinforced thermoplastic part comprises at least one integral feature, the method further comprising:
injecting the flowable mold charge into the part cavity and the fitting cavity to form the integral feature by compressing the flowable mold charge in the charge cylinder.

12. The method of claim 11, wherein the at least one integral feature is selected from group consisting of an integrally molded 2-lug fitting, an integrally molded lightening hole, an integrally molded open interior, an integrally molded fitting integrally formed with and along a wall of the part, an integrally molded pair of grooves extending an entire length of the part, an integrally molded hat portion of the part, and combinations thereof.

13. The method of claim 11, wherein the fitting cavity further comprises a mold module detachably connected to the mold, the method further comprising:
attaching the mold module to the mold.

14. The method of claim 12, wherein the number of electromagnetic induction heaters further comprises:
a number of smart susceptors.

15. An apparatus for compression molding a fiber reinforced plastic resin part, the apparatus comprising:
a tool for pre-consolidating a pre-consolidated charge from a quantity of fiber reinforced thermoplastic resin flakes, wherein the tool includes: a tube into which a quantity of fiber reinforced thermoplastic resin flakes can be introduced, and at least one band heater sleeved over the tube for heating the tube;
the quantity of fiber reinforced thermoplastic resin flakes, wherein the fiber reinforced thermoplastic resin flakes have a generally oval shape such that fibers of the fiber reinforced thermoplastic resin flakes have varying lengths of between approximately 0.5 inches and approximately 1.0 inches, wherein the fiber reinforced thermoplastic resin flakes consist essentially of: a fiber content of about 30% to about 65%, by volume and a resin content of about 35% to about 70%, by volume;
a mold having a longitudinal axis, a part cavity, and at least one detachable fitting cavity;
a charge cylinder having a longitudinal axis generally axially aligned with the longitudinal axis of the mold to reduce a possibility of fiber degradation, wherein charge cylinder is coupled with the part cavity and adapted to contain the pre-consolidated charge of the fiber reinforced thermoplastic resin flakes;
a heater for heating the charge cylinder to form a flowable mixture of resin and reinforcing fibers from the pre-consolidated charge;
a piston in the charge cylinder; and
an actuator coupled with the piston for forcing the piston through the charge cylinder along the longitudinal axis of the charge cylinder to compress the flowable mixture into the part cavity.

16. The apparatus of claim 15, wherein the mold includes a mold module detachably connected to the mold for molding a fitting integral with the part.

17. The apparatus of claim 16, wherein the mold module is selected from the group consisting of: a mold module for molding an integrally molded 2-lug fitting, a mold module for molding an integrally molded lightening hole, a mold module for molding an integrally molded open interior, a mold module for molding an integrally molded fitting integrally formed with and along a wall of the part, a mold module for molding an integrally molded pair of grooves extending an entire length of the part, a mold module for molding an integrally molded hat portion of the part, and combinations thereof.

18. The apparatus of claim 15, wherein the heater further comprises:
a number of electro-magnetic induction heaters and a number of smart susceptors.

19. The apparatus of claim 15, wherein the heater comprises a plurality of heating bands surrounding the cylinder for heating the cylinder.

20. The apparatus of claim 15, wherein the fibers are selected from the group consisting of carbon fibers, metal fibers, ceramic fibers, glass fibers, and combinations thereof.

21. The apparatus of claim 15, wherein the mold tool includes at least one air vent coupled with the part cavity and capable of allowing escape of air within the part cavity displaced by the flowable mixture forced into the part cavity.

22. The apparatus of claim 15, wherein the part cavity has at least one contour along its length.

23. The apparatus of claim 15, wherein the part cavity has a cross-section that varies in shape along a length of the part cavity.

24. The apparatus of claim 15, wherein the resin is selected from the group consisting polyetherimide resin, polyphenylene sulphide resin, polyethersulfone resin, polyetheretherketone resin, polyetheretherketone resin, polyetherketoneketone-fc grade resin, and combinations thereof.

25. The apparatus of claim 15, wherein the tool further includes:
   a mass adapted to be introduced into the tube for compressing the fiber reinforced thermoplastic resin flakes under the force of gravity acting on the mass.

* * * * *